United States Patent Office 2,800,680
Patented July 30, 1957

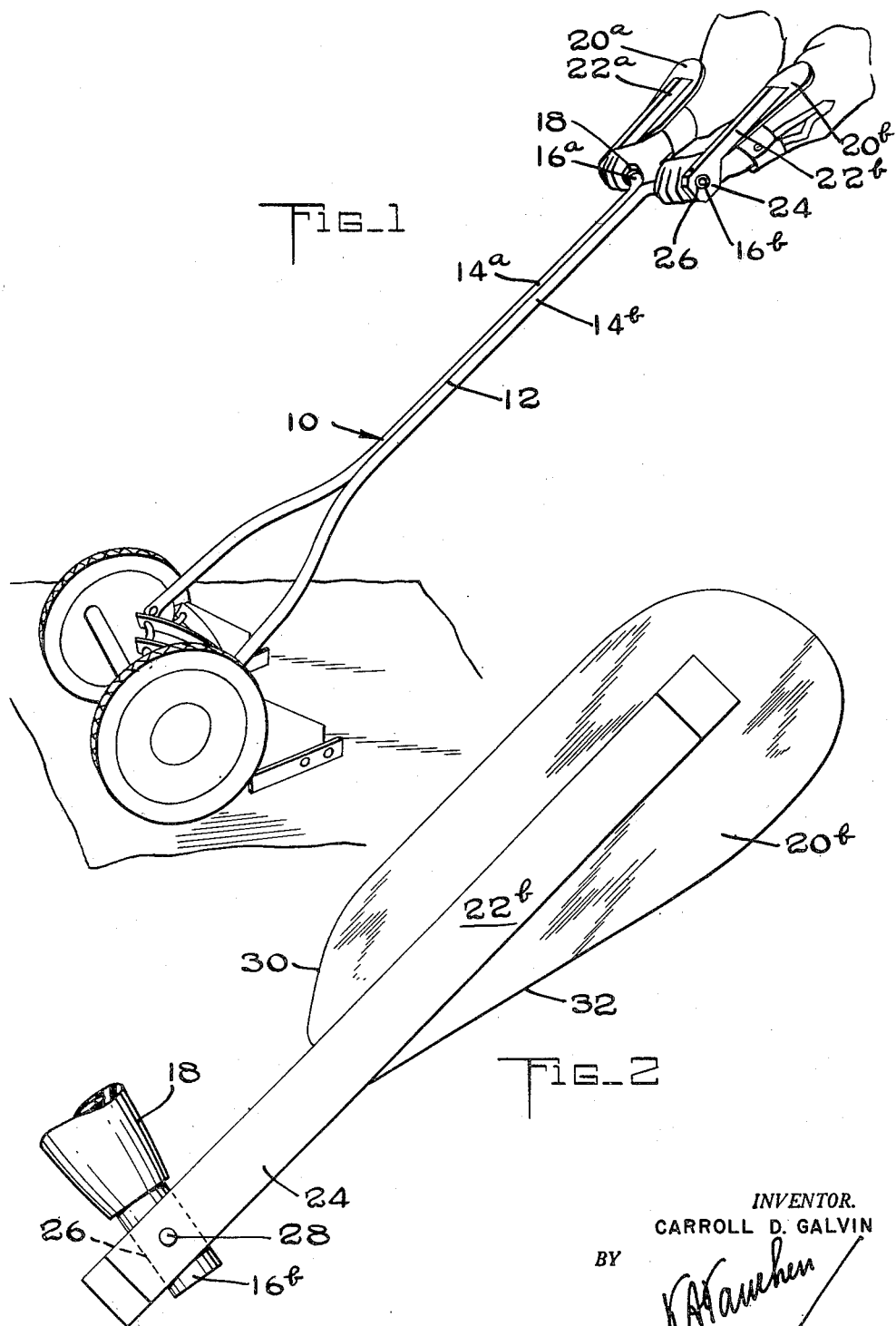

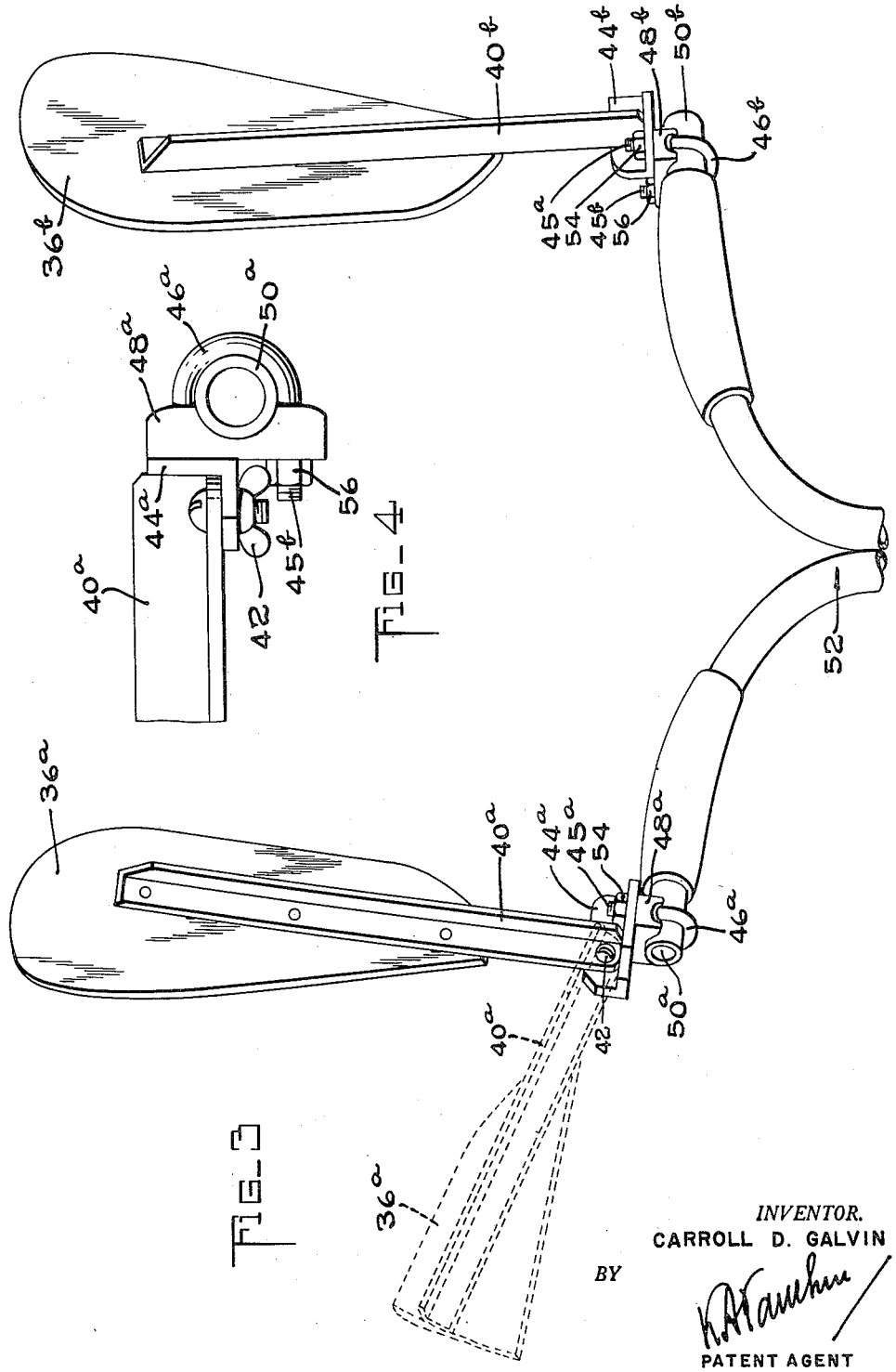

2,800,680

PUSHER BAR FOR LAWN MOWERS AND LIKE APPARATUS

Carroll D. Galvin, Orinda, Calif.

Application May 23, 1955, Serial No. 510,253

2 Claims. (Cl. 16—110)

The present invention relates to hand-operated lawn mowers, rollers, spraying devices and like apparatus. More particularly the present invention relates to the booms or bars which are employed to push lawn mowers and like apparatus across the lawn and which are provided with laterally turned handles at their upper ends.

It is an object of my invention to provide an improved pusher bar, for lawn mowers and like apparatus, that lightens the effort in pushing such apparatus during practical use thereof, by enabling parts of the operator's body other than his hands to share in the pushing effort.

Another object of the invention is to provide an improved pusher bar, for lawn mowers and like apparatus, that provides such points of leverage for the operator's hands and arms as will materially lighten the effort involved in operating apparatus of the type referred to.

Yet another object of the invention is to provide an attachment for the pusher bars of lawn mowers and like apparatus that lightens the effort involved in operating such apparatus.

These and other objects of the present invention will be apparent from the following description of the accompanying drawings which illustrate certain preferred embodiments thereof and wherein:

Fig. 1 is a perspective view illustrating a lawn mower provided with a pusher bar constructed in accordance with my invention.

Fig. 2 is a fragmentary plan view of one of the handles at the end of the pusher bar shown in Fig. 1.

Fig. 3 is a fragmentary perspective showing the upper end of the pusher bar of a lawn mower provided with an attachment embodying my invention.

Fig. 4 is a fragmentary side elevational detail view illustrating the manner in which the attachment of the invention is secured to the handles of the pusher bar shown in Fig. 3.

The invention provides plates that are firmly attached to the laterally directed handles at the upper end of the pusher bar of hand-operated lawn mowers, rollers, spraying devices and like apparatus and which overlie the forearms of the operator when his hands grip the handles of the pusher bar (Fig. 1). Hence, his forearms participate in the effort of pushing the apparatus across the lawn and at the same time ease the effort, on the operator's part, of holding his hands rigid with regard to his forearms against the natural tendency of his hands to bend on his wrist joints relative to the forearms as they endeavor to overcome the inertia of the apparatus and the resistances offered to forward movement of the apparatus by the grass and by the unevenness of the ground.

Fig. 1 illustrates a typical manually operated lawn mower 10 which is provided with an obliquely rising pusher bar 12 composed of two adjacently positioned tubular rods 14a, 14b whose upper ends are turned laterally to form horizontally extending handles 16a and 16b that are covered with rubber sheaths 18. In accordance with the invention I secure flat plates 20a and 20b of wood, metal or plastic to the outer ends of the handles 16a and 16b, respectively, in such a manner that they lie substantially in, or slightly above, the plane determined by the pusher bar 12 and its laterally directed handles 16a, 16b. For this purpose the plates 20a and 20b may be secured along their upper surfaces to ribs 22a and 22b, respectively, that project in a downward direction a distance beyond the lower edges of the plates 20a and 20b. Their projecting lower ends are extended into heads 24 provided with circular apertures 26 that are engaged over the ends of the laterally directed handles 16a and 16b. Pins 28 extending through said lugs and the ends of the handles 16a and 16b, respectively, hold the ribs 22a and 22b in their proper position angularly of the tubular handles 16a and 16b wherein the undersides of the plates 20a and 20b lie substantially in the plane defined by the pusher bar 12 and its handles 16a and 16b.

In accordance with the invention the plates 20a and 20b are formed in such a manner that when they bear against the forearms of the operator whose hands grip the handles 16a and 16b, they do not restrict the free movability of the operator's hands and to this end the lower end of the inner edges of said plates may be bevelled off as shown at 30 in Fig. 2. Also, to permit an operator to bend his elbows when the time has come to turn the apparatus, the outer edges of said plates may be arranged to slant in a downward direction toward the projecting end portions of the ribs 22a and 22b, respectively, as shown at 32 in said Fig. 2.

Fig. 3 illustrates an arrangement by means of which the present invention may be incorporated in the pusher bars of existing lawn mowers and like apparatus. For this purpose plates 36a and 36b which may be of the same conformation as the plates 20a and 20b shown in Figs. 1 and 2, may be secured to ribs in the form of angle bars 40a and 40b, respectively, that project downwardly beyond the tapering ends of said plates. The projecting ends of angle bars 40a and 40b are secured, by means of bolts and wing nuts 42, to short cross bars 44a and 44b, respectively, that are engaged over the upper shanks 45a and 45b of U-shaped clamps 46a and 46b which are provided with clamping members 48a and 48b. By engaging said U-shaped clamps over the outer ends of the handles 50a and 50b formed by the pusher bar 52 of an existing lawn mower or like apparatus, and by tightening nuts 54 and 56 engaged over the threaded ends of the U-shaped clamps 46a and 46b above the clamping members 48a and 48b (Fig. 4), the plates 36a and 36b may be rigidly secured in their proper positions to the handles of the pusher bar as shown in Fig. 3. The particular embodiment of the invention illustrated in Figs. 3 and 4 has the added advantage that by loosening the wing nuts 42 the plates 36a and 36b may be swung outwardly away from the operator's forearms into the position indicated in phantom lines at the left side of Fig. 3 to permit free movement of the operator's arms when he has come to the rim of his lawn and wishes to turn the mower, roller or spraying apparatus as the case may be.

The arrangement of the present invention eases the operator's task in pushing a lawn mower, roller or spraying apparatus to a remarkable degree. It is of simple construction, and in the form illustrated in Figs. 3 and 4 it may easily be applied to, or removed from, the pusher bars of existing apparatus of the type referred to.

While I have explained my invention with the aid of certain preferred embodiments thereof, it will be understood that the invention is not limited to the specific constructional details illustrated and described, which may be departed from without departing from the scope and spirit of the invention.

What I claim is:

1. A pusher bar assembly for lawn mowers and like apparatus comprising, an upwardly and rearwardly inclined straight shank having on its upper end a pair of oppositely directed laterally extending handles, the longitudinal axes of said shank and handles being in a common plane, a substantially flat oblong plate extending from each handle upwardly and rearwardly relative to the shank and in a plane substantially parallel to the common plane of the shank and handle axes and spaced vertically thereabove a distance such that the plates overlie and bear against the forearms of an operator when grasping the handles in his hands, and means securing the forward end portion of each plate rigidly to its adjacent handle.

2. A pusher bar assembly according to claim 1 wherein said plates have converging side edges at their front end portions providing clearance for the back of an operator's hands while the plates are engaged over his forearms.

References Cited in the file of this patent

UNITED STATES PATENTS

| | | |
|---|---|---|
| 870,676 | Hayden | Nov. 12, 1907 |
| 2,651,804 | Wilkin | Sept. 15, 1953 |